UNITED STATES PATENT OFFICE.

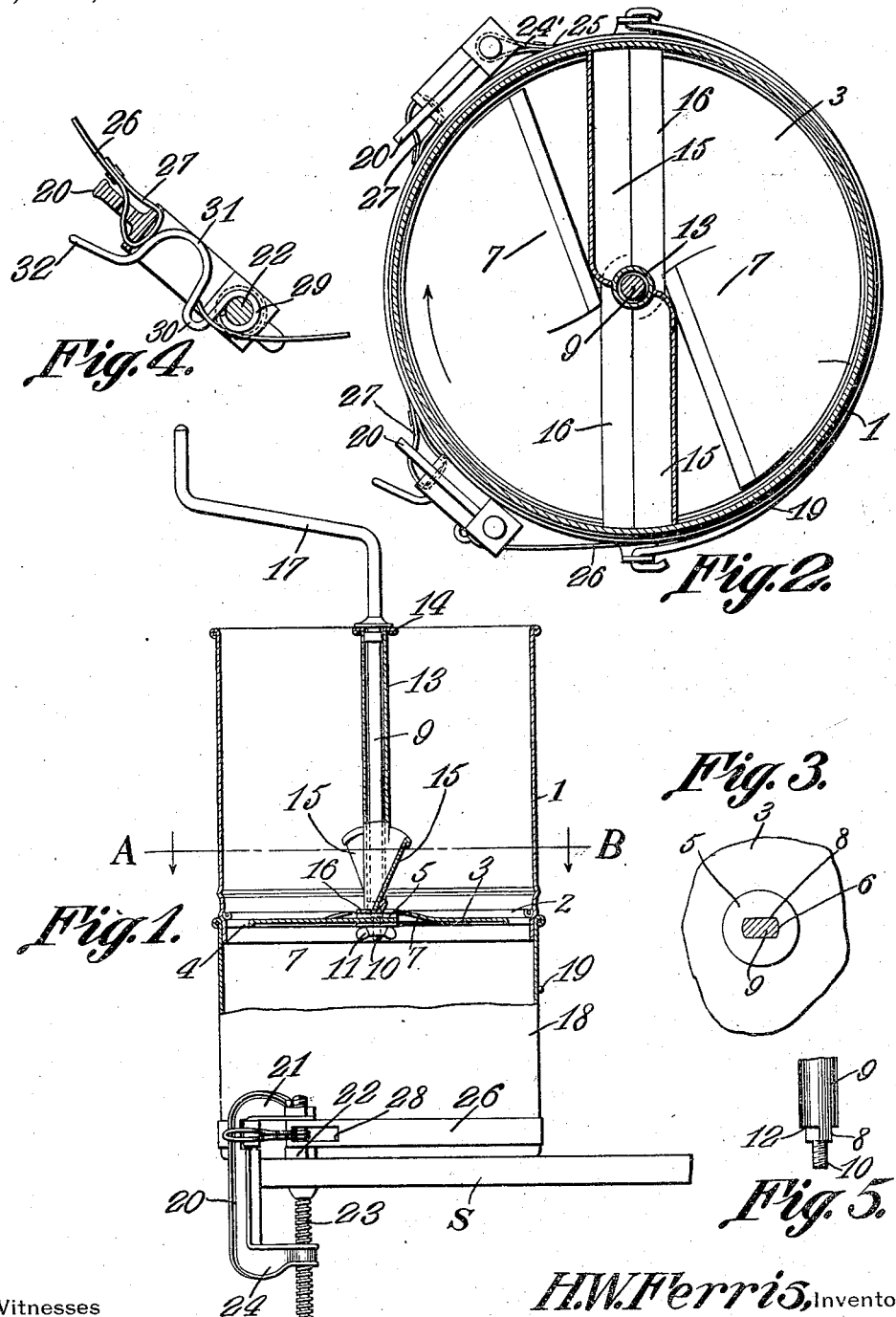

HENRY W. FERRIS, OF LYNDON, KANSAS.

VEGETABLE-CUTTER.

1,190,275.   Specification of Letters Patent.   Patented July 11, 1916.

Application filed April 22, 1915. Serial No. 23,174.

*To all whom it may concern:*

Be it known that I, HENRY W. FERRIS, a citizen of the United States, residing at Lyndon, in the county of Osage and State of Kansas, have invented a new and useful Vegetable-Cutter, of which the following is a specification.

This invention relates to a vegetable cutter designed especially for slicing tomatoes, potatoes, apples, and the like, one of the objects of the invention being to provide a cutter which is simple and durable in construction, which can be easily operated, and which is provided with a receiver in the form of a pail or bucket into which the slices are discharged.

A further object is to provide a simple form of cutter having novel means for deflecting or packing the articles being cut into the path of the cutting edges.

Another object is to provide a device of this character the parts of which can be taken apart readily for the purpose of cleaning the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a view partly in elevation and partly in vertical section through the device secured upon a support. Fig. 2 is an enlarged section on line A—B Fig. 1. Fig. 3 is a top plan view of the central portion of the cutting disk and showing the operating stem in section. Fig. 4 is an enlarged horizontal section through the buckle used in connection with the fastening device. Fig. 5 is an elevation of the lower end portion of the actuating shaft.

Referring to the figures by characters of reference 1 designates a cylindrical casing provided, near its lower end, with an annular shoulder 2. Mounted for rotation within the lower end portion of the casing 1 and fitted against the lower face of the shoulder 2 is a cutting disk 3 the periphery of which is provided with an annular flange 4 depending therefrom and designed to stiffen the disk. A washer 5 is secured upon the middle portion of the disk and is provided with an angular opening 6, this opening extending through the disk 3. Struck upwardly from the disk are elongated cutters 7 integral with the disk and having their cutting edges preferably parallel but located at opposite sides of the center of the disk, as shown particularly in Fig. 2, both cutting edges being disposed at a tangent to a circle which might be inscribed upon the middle portion of the disk 3. The disk 3 fits snugly within the casing 1 and the angular opening 6 is adapted to receive the angular portion 8 of a shaft 9 which extends upwardly beyond the casing 1, there being a threaded stem 10 below said angular portion of the shaft 9 and which is adapted to be engaged by a wing nut 11 bearing upwardly against the disk, thus to clamp the disk against a shoulder 12 formed upon the shaft at the upper end of the angular portion 8.

Shaft 9 is mounted for rotation within a tubular core 13 secured at its upper end to the middle portion of a cross strip 14 fastened to the upper end of casing 1 and mounted at its lower end between two opposed deflecting wings 15 soldered or otherwise secured at their outer ends of the casing 1 close to the shoulder 2. Each of these wings is provided, at its lower edge, with a ledge 16 extending throughout the length thereof and supported close to the path of the cutting edges of the blades 7. The wings 15 are so shaped that, during the rotation of the disk 3 in the direction indicated by the arrow in Fig. 2, any material supported by the disk will be carried thereby against the wings and will be deflected downwardly by the wings so as thus to pack between the wings and the disk and be held where the blades 7 can properly act on the material. The lower faces of the ledges 16 constitute sharpening surfaces along which the edges of the blades 7 scrape while passing under the deflecting wings 15 so that the device is thus self-sharpening. Shaft 9 can be rotated in any suitable manner, as by means of a crank arm 17 at the upper end thereof.

When it is desired to remove the parts for the purpose of cleaning them it is merely necessary to detach the nut 11 whereupon the disk 3 can be withdrawn downwardly from the casing 1 and the shaft 9. Said shaft can then be lifted from the core 13, whereupon the various parts can be cleaned readily.

The lower portion of the casing 1 is adapted to fit snugly within the upper end of a pail or bucket 18 provided with a bail 19 as usual so that it can be carried readily after casing 1 has been removed from it. This pail or bucket is adapted to be held to a table or other support S by means of a fastener of peculiar construction. This fastener includes two opposed clamps of like construction, each clamp including a yoke 20 having a jaw 21 provided with a depending stem 22 disposed in alinement with a clamping screw 23 carried by the opposed jaw 24. Stem 22 of one of the yokes is engaged by the looped end 24' of a metal strap 25. The two yokes 20 are held together by a strap 26 having a loop 27 at each end, these loops extending around the respective yokes 20. That end of the strap 25 remote from loop 24' is provided with an opening 28 and this opening is adapted to receive a buckle of novel form mounted upon the stem 22 of the clamp adjacent thereto. Said buckle is preferably formed of heavy spring wire bent to form an eye 29 extending around the stem 22 and at one end of a U-shaped loop 30. This loop merges into a bowed portion 31 from which extends a finger piece 32. When it is desired to clamp the straps 26 and 25 about the bucket or pail 18, the said straps are first extended around the bucket, after which the finger piece 32 is inserted through the opening 28 until the loop 30 is brought within the opening. The buckle made up of the parts 29, 30, 31 and 32 is then pressed against its supporting yoke 20 so as to bring the bowed portion within the yoke, this resulting in pulling on the strap 25 and binding it tightly against the bucket, as will be obvious by referring to Fig. 4. Obviously the clamps can be used for gripping a table or other support S between stems 22 and the screws 23.

After a device such as described has been placed in position, the articles to be sliced are put in the casing 1 and the shaft 9 is then rotated. The articles will be packed under the deflectors 15 and thus held in the paths of the blades 7 so that said blades will cut off slices which will be directed through the disk 3 and into the pail or bucket 18. After the material has been sliced, the casing 1 can be removed from the bucket or pail 18 and, by loosening the buckle engaging the strap 25, said strap can be detached and the bucket or pail 18 removed from the table or support S.

What is claimed is:—

A vegetable cutter including a receptacle, a casing detachably seated thereon and having an interior annular shoulder, said casing being open at its ends, a concentric tubular core within the casing, oppositely extending and oppositely disposed deflecting wings constituting connections between the core and the wall of the casing for holding the core centered within the casing, each of said wings being straight for the greater portion of its length and having its inner portion curved laterally toward the core, there being sharpening ledges extending throughout the length of each wing, a shaft mounted for rotation in the core and supported thereby, a disk secured to the lower end portion of the shaft and revoluble therewith, the marginal portion of the disk bearing upwardly against the interior shoulder within the casing, opposed cutting blades upstruck from the disk and movable successively into engagement with the sharpening ledges, said ledges being extended in the direction of rotation of the blades, the cutting edges of the blades being disposed along straight lines with the core therebetween.

In testimony that I claim the foregoing as my own, I have hereto affixed my signature in the presence of two witnesses.

HENRY W. FERRIS.

Witnesses:
S. ALICE KELLY,
E. BARRETT.